United States Patent [19]

Walker et al.

[11] Patent Number: 5,448,859
[45] Date of Patent: Sep. 12, 1995

[54] CONCEALED SERVICES MODULE

[75] Inventors: James A. Walker, Oklahoma City; Taylor C. Culpepper, Norman, both of Okla.

[73] Assignee: Gaddis-Walker Electric, Inc., Oklahoma City, Okla.

[21] Appl. No.: 230,450

[22] Filed: Apr. 20, 1994

Related U.S. Application Data

[63] Continuation of Ser. No. 66,617, May 24, 1993, abandoned, which is a continuation of Ser. No. 795,582, Nov. 21, 1991, abandoned, which is a continuation of Ser. No. 164,434, Mar. 4, 1988, abandoned.

[51] Int. Cl.$^6$ .................. F04F 17/08; G09F 7/20; H02G 3/12
[52] U.S. Cl. ...................... 52/38; 52/220.1; 52/220.8; 174/49
[58] Field of Search ............ 52/27, 28, 38, 220.1, 52/220.7, 220.8; 40/152.1, 661; 109/50, 51, 52; 174/48, 49, 66; 248/476, 490

[56] References Cited

U.S. PATENT DOCUMENTS

| | | | |
|---|---|---|---|
| D. 261,804 | 11/1981 | Foster et al. | |
| 1,287,699 | 12/1918 | Kinsman | 248/476 |
| 1,606,870 | 11/1926 | Corwin | 174/48 X |
| 2,773,728 | 12/1956 | La Barre | 312/227 |
| 3,131,512 | 5/1964 | MacLeod, Jr. | 52/221 |
| 3,200,244 | 8/1965 | Meyer | |
| 3,462,892 | 8/1969 | Meyer | |
| 3,491,486 | 1/1970 | Caruth | 489/463 |
| 3,567,842 | 3/1971 | Meyer | 52/221 |
| 3,692,920 | 9/1972 | Santarelli | |
| 3,699,235 | 10/1972 | Wasson et al. | |
| 3,836,937 | 9/1974 | Donato | |
| 3,931,452 | 1/1976 | Nilsson | |
| 4,017,137 | 4/1977 | Parks | |
| 4,135,775 | 1/1979 | Driscoll | |
| 4,277,123 | 7/1982 | Haworth et al. | |
| 4,338,485 | 7/1982 | Fullenkamp et al. | |
| 4,475,322 | 10/1984 | Russo et al. | |
| 4,559,410 | 12/1985 | Hostetter | 174/48 |
| 4,642,418 | 2/1987 | Menchetti | 174/48 |
| 4,646,211 | 2/1987 | Gallant et al. | |
| 4,753,055 | 6/1988 | Durham, Jr. | 52/28 |

FOREIGN PATENT DOCUMENTS 510857  3/1955  Canada ................. 109/50

OTHER PUBLICATIONS

Exhibit A–Photocopy of brochure for Power–Pak counterbalance and retractor mechanism marketed by Caldwell Mfg. Co., Rochester, N.Y., date unknown.
Exhibit B–Photocopy of brochure for Type 16 gas cylinders marketed by SUSPA, Inc., Grand Rapids, Michigan, date unknown.
Exhibit C–Photocopy of brochure published by Ohmeda Medical Engineering Co., Norcross, Ga., date unknown.
Exhibit D–Photocopy of photograph of a wall unit at North Mississippi Women's Hospital, Tupelo, Miss., manufactured by Hill–Rom Co., division of Hillenbrand Industries.
Exhibit E–Photocopy of photographs of a wall unit at All Saints Cityview Hospital, Ft. Worth, Tex., date unknown.
Exhibit F–Photocopy of photographs of another wall unit manufactured by Hill–Rom Co., date unknown.

(List continued on next page.)

Primary Examiner—Michael Safavi
Attorney, Agent, or Firm—McKinney, Stringer & Webster

[57] ABSTRACT

A concealed services module comprising a frame, service outlets mounted on the frame and a picture assembly. The frame preferably is installed inside a wall so that only the service outlets are exposed, and the picture assembly is mounted over the outlets to conceal them. The picture assembly also may be mounted over existing service outlets in a wall. The picture assembly is slidably mounted for up and down movement, and includes a device such as a counterbalancing mechanism to retain it in the up position.

22 Claims, 9 Drawing Sheets

OTHER PUBLICATIONS

Exhibit G–Photocopies of a handwritten Speed Message dated Jan. 31, 1986, and drawings.

Exhibit H–Photocopy of a memorandum dated Feb. 13, 1986, between two employees at Ohmeda Medical Engineering Co. regarding "Hidden Modular Wall."

Exhibit I–Photocopy of written communication dated Apr. 23, 1986, to Applicants by Ohmeda Medical Engineering Co., Madison, Wis., and drawing.

Exhibit J–Photocopy of photographs of a prototype in-wall modular headwall unit constructed Oct., 1986.

Exhibit K–Photocopies of drawings dated Nov. 3, 1986, made by Ohmeda Medical Engineering Co., Norcross, Ga., sent to Applicants.

Exhibit L–Photocopy of a written communication dated Mar. 6, 1987, from Ohmeda Medical Engineering Co. to Applicants, and attached drawings.

Exhibit M–Photocopies of drawings of a wall unit and room plan designed by Boyd–Sobieray Associates, Inc., late 1987.

Exhibit N–Photocopy of a letter dated Oct. 5, 1987, from Applicants to Ohmeda Medical Engineering Co.

Exhibit O–Accuride Model 201 specification sheet of Applicants' preferred slide assembly, date unknown.

Exhibit P–Hill–Rom brochure showing and describing "The First Impression Series," date unknown.

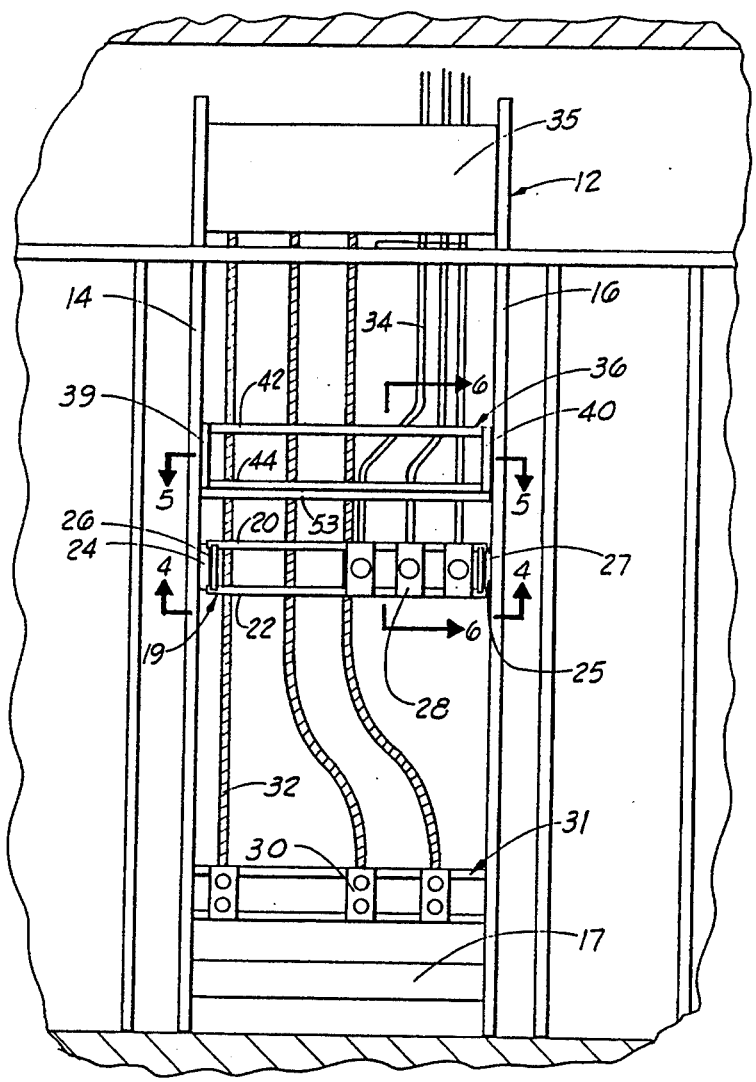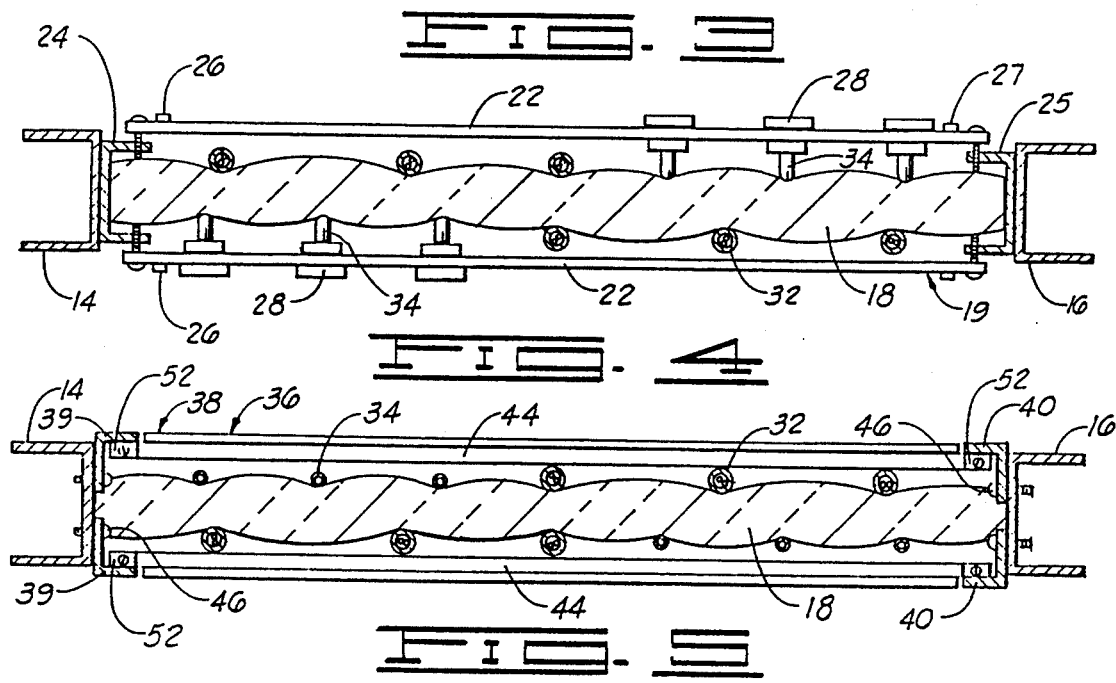

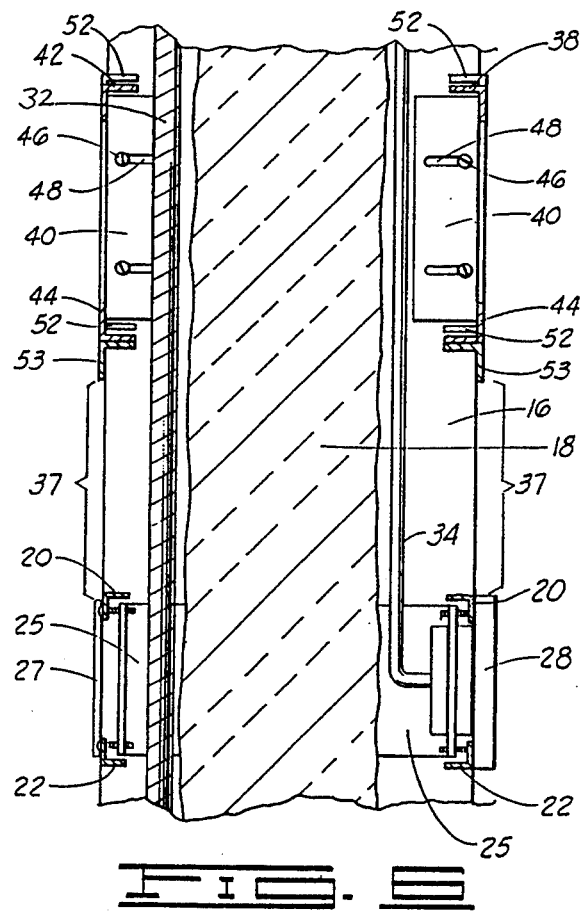

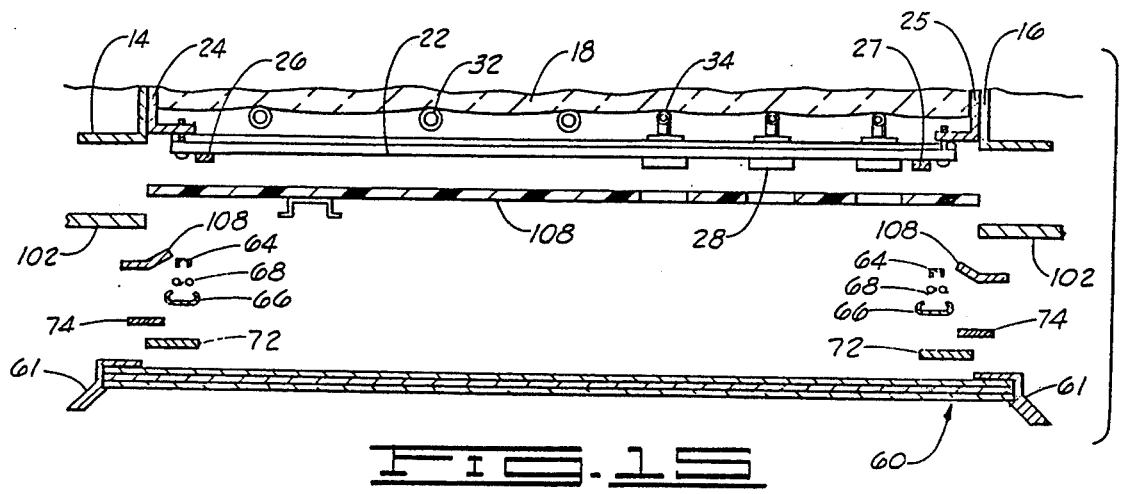
FIG. 15
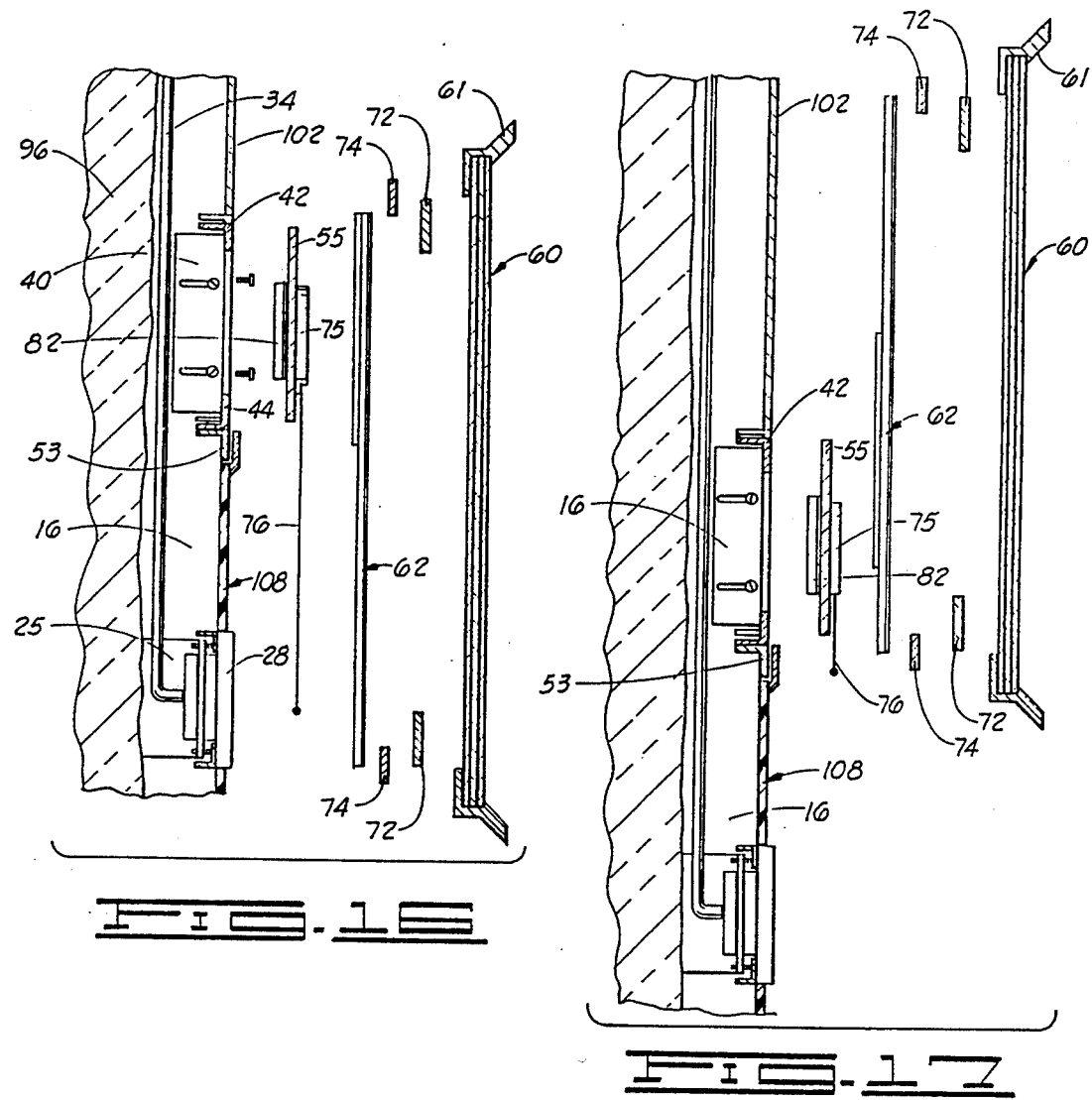
FIG. 16
FIG. 17

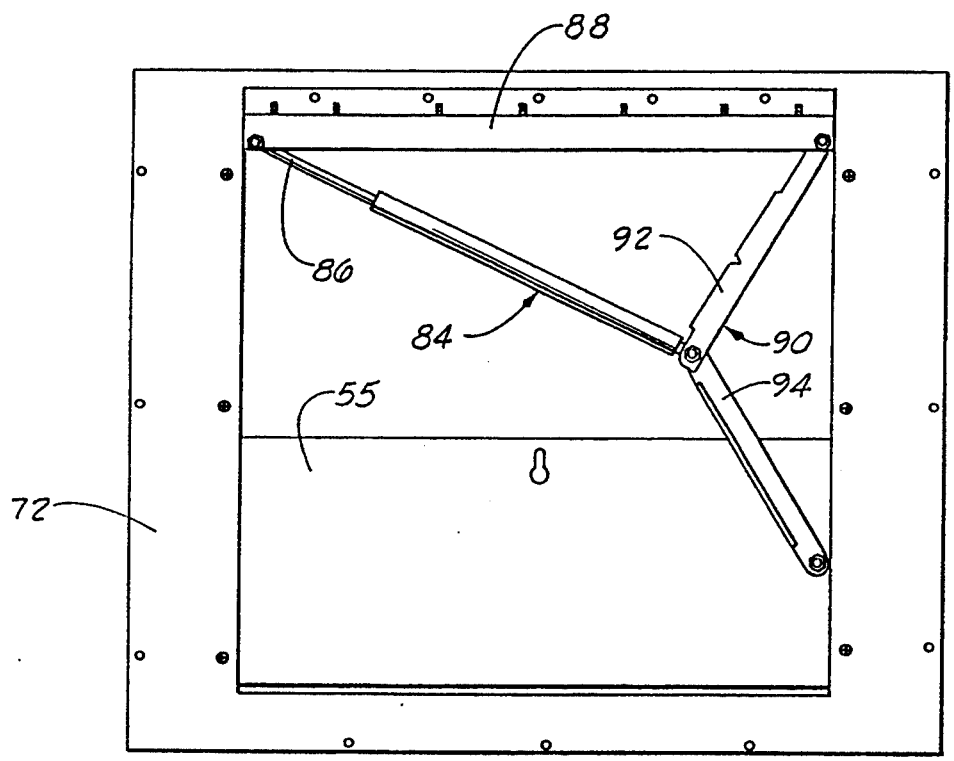
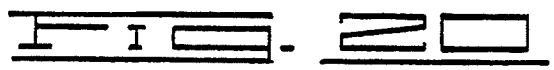
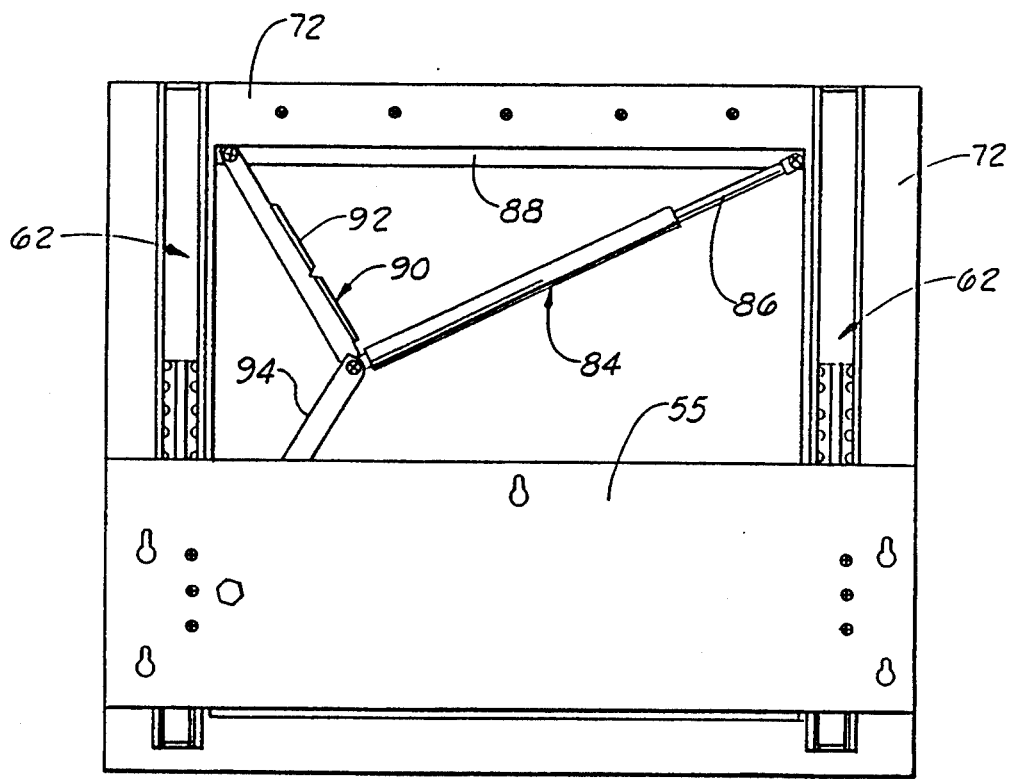
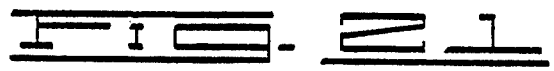

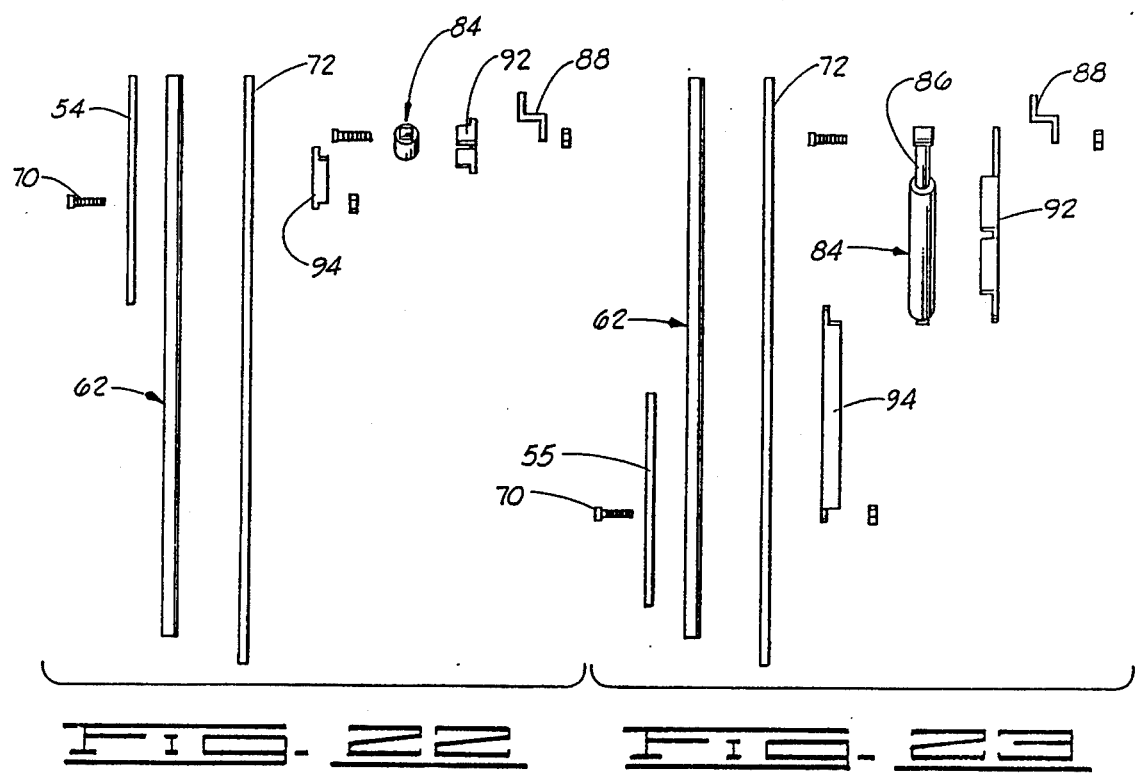
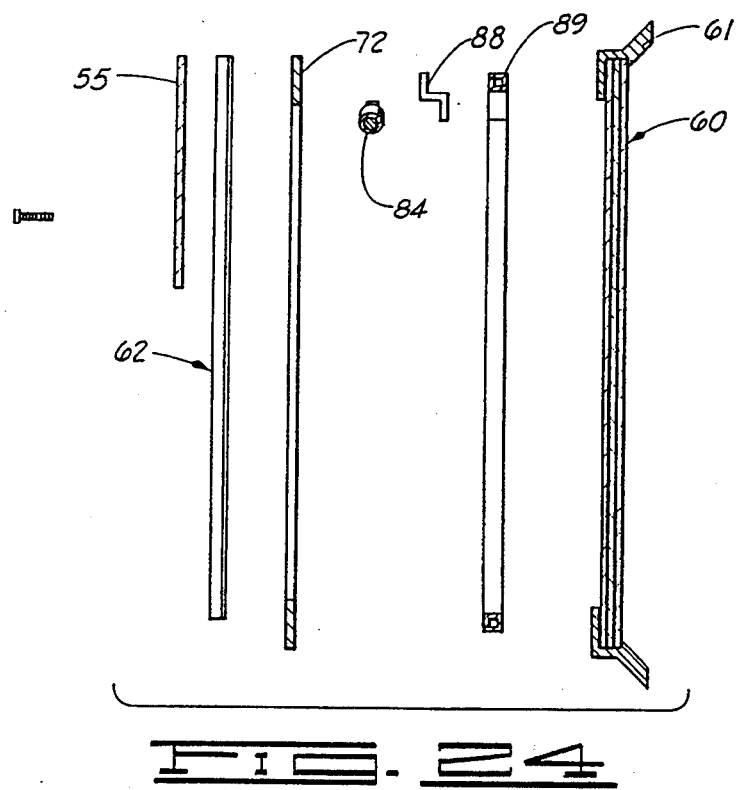

CONCEALED SERVICES MODULE

This is a continuation of application Ser. No. 08/066,617, filed on May 24, 1993, entitled CONCEALED SERVICES MODULE, now abandoned, which was a continuation of prior application Ser. No. 07/795,582, filed on Nov. 21, 1991, entitled CONCEALED SERVICES MODULE, now abandoned, which was a continuation of prior application Ser. No. 07/164,434, filed on Mar. 4, 1988, entitled CONCEALED SERVICES MODULE, now abandoned.

FIELD OF THE INVENTION

This invention relates generally to modular headwalls for providing gas, vacuum, electrical and other services to patient care areas in health care facilities.

SUMMARY OF THE INVENTION

The present invention is directed to a services module comprising a frame having at least one side adapted for supporting at least one service outlet. At least one service outlet is supported on the side of the frame adapted therefor. A picture assembly is provided on the side of the frame supporting the service outlet. The picture assembly includes a picture and means for slidably mounting the picture for movement between a closed position in which the outlet is concealed and an open position in which the outlet is accessible. The open and closed positions are in vertical alignment so that one is higher than the other. Retaining means is also included for retaining the picture in the higher position.

The present invention also includes a concealed services module comprising a frame having at least one side adapted for supporting at least one service outlet. At least one service outlet is supported on the side of the frame adapted therefor. A picture assembly is provided on the side of the frame supporting the service outlet. The picture assembly includes a picture and means for slidably mounting the picture for movement between a closed position in which the outlet is concealed and an open position in which the outlet is accessible. The open and closed positions are in vertical alignment so that one is higher than the other. Retaining means is also included for retaining the picture in the higher position. The frame is adapted for installation within a wall so that when the picture is in the closed position, the entire module is concealed.

Still further, the present invention comprises a services module which includes a frame having at least one side adapted for supporting at least one service outlet and at least one service outlet supported on the at least one side of the frame adapted therefor. A picture is on the at least one side of the frame supporting the at least one service outlet, and the picture is slidably mounted for movement between a closed position in which the at least one service outlet is concealed and an open position in which the at least one service outlet is accessible. The open and closed positions are in vertical alignment so that one is higher than the other, and a retaining assembly serves to retain the picture in the higher position.

The present invention further comprises a concealed services module which includes a frame having at least one side adapted for supporting at least one service outlet and at least one service outlet supported on the at least one side of the frame adapted therefor. A picture is on the at least one side of the frame supporting the at least one service outlet, and the picture is slidably mounted for movement between a closed position in which the at least one service outlet is concealed and an open position in which the at least one service outlet is accessible. The open and closed positions are in vertical alignment so that one is higher than the other, and a retaining assembly serves to retain the picture in the higher position. The frame is adapted for installation inside a wall so that when the picture is in the closed position, the entire module is concealed.

BRIEF DESCRIPTION OF THE DRAWINGS

FIG. 3 shows the frame of the services module positioned in the wall space. The surface of the wall and the wall accessory assembly have been removed.

FIG. 4 shows a horizontal cross-sectional view taken at line 4—4 of FIG. 3.

FIG. 5 shows a horizontal cross-sectional view taken at line 5—5 of FIG. 3.

FIG. 6 shows a partial vertical cross-sectional view of the module taken at line 6—6 in FIG. 3.

FIG. 7 shows a partial frontal view of the installed module frame after the wall covering has been applied.

FIG. 8 shows the portion of the installed module frame shown in FIG. 7. A trim panel is attached over the service outlets.

FIG. 15 is a horizontal cross-sectional view taken at line 15—15 in FIG. 1. Only one side of the installed module is shown.

FIG. 16 is a partial vertical cross-sectional view taken at line 16—16 in FIG. 1. Only one side of the installed module is shown.

FIG. 17 is a partial vertical cross-sectional view taken at line 17—17 in FIG. 2. Only one side of the installed module is shown.

FIG. 20 is a front view of the assembly shown in FIG. 19 with the assembly in the up or open position.

FIG. 21 is a back view of the assembly shown in FIG. 20.

FIG. 22 is an exploded side view of the assembly shown in FIG. 19.

FIG. 23 is an exploded side view of the assembly shown in FIG. 19 with the assembly in the up or open position.

FIG. 24 is an exploded vertical cross-sectional view taken at line 24—24 in FIG. 18.

DETAILED DESCRIPTION OF THE PREFERRED EMBODIMENT

In the patient care areas of most health care facilities it is necessary that services such as electricity, vacuum, air and oxygen be immediately available. However, the appearance of the outlets for the services is unattractive and to some patients may even be alarming. The present invention provides for concealment of selected service outlets when they are not in use.

Figure 1:
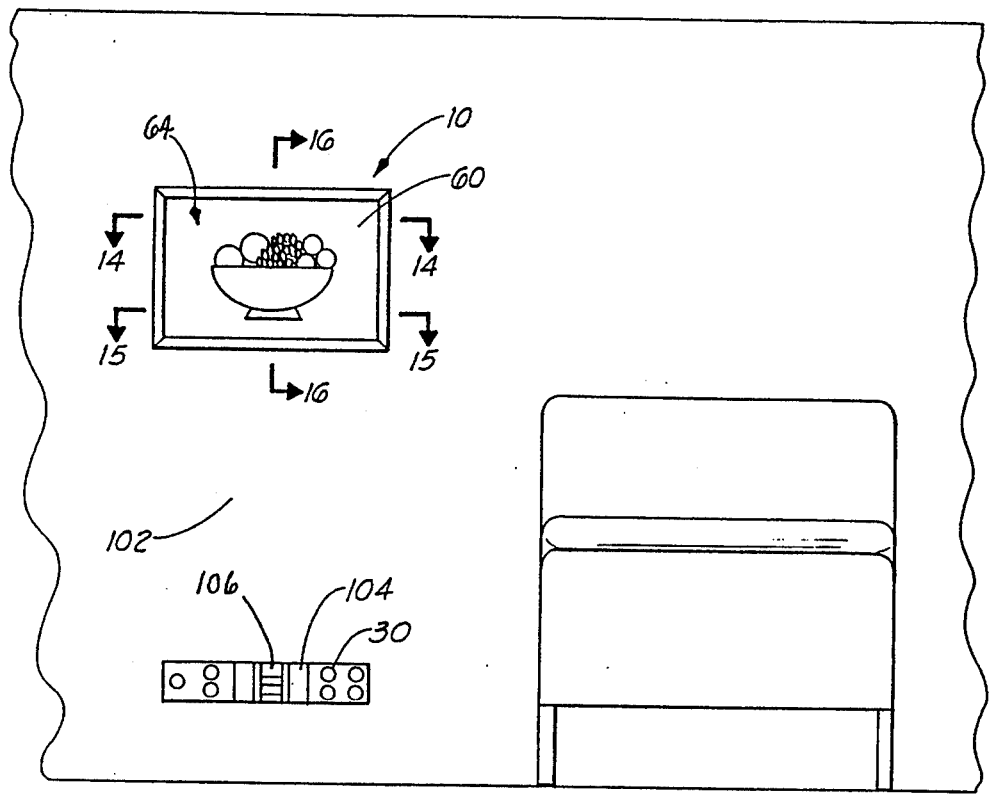
FIG. 1 is a front elevational view of a wall in a hospital room in which the services module of the present invention has been installed. The wall accessory conceals service outlets mounted behind it.
Figure 2:
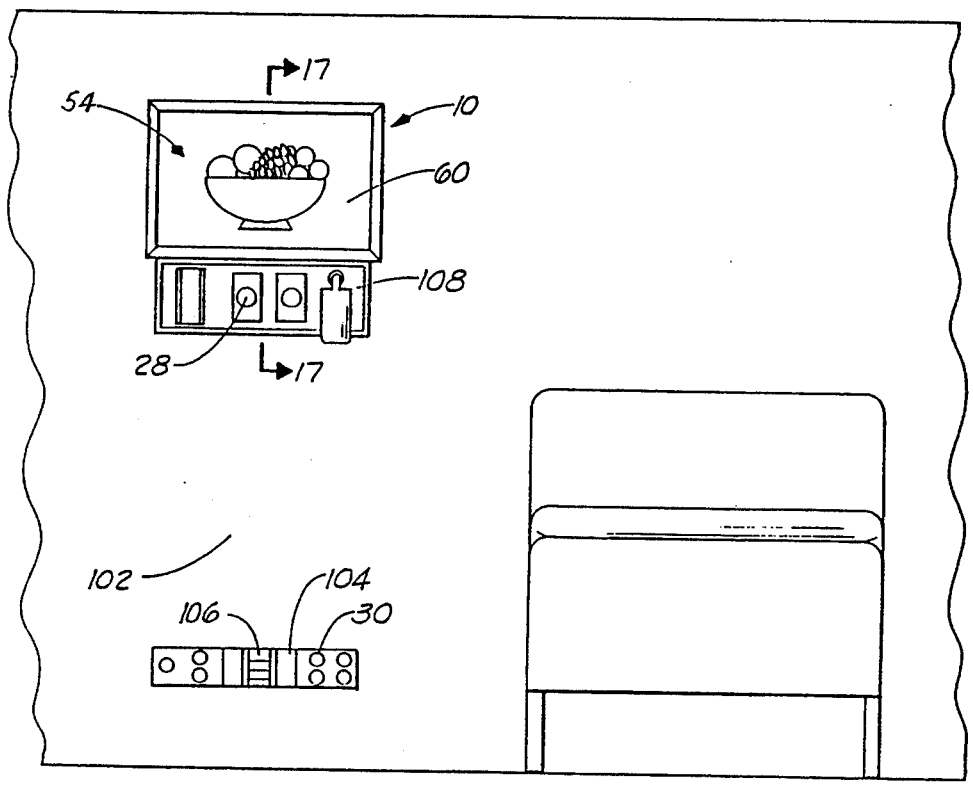
FIG. 2 is a front elevational view of the wall shown in FIG. 1. The wall accessory is in the open position exposing the service outlets.

With reference now to FIGS. 1 and 2, the present invention comprises a concealed services module designated generally by the reference numeral 10. As shown in the Figures, in the preferred embodiment the frame of the module is installed behind the wall and the service outlets are concealed by a slidably mounted picture or other wall accessory. The wall accessory is moved between the closed position shown in FIG. 1 to the open position shown in FIG. 2 in which the services are accessible.

In accordance with the present invention, a frame first is constructed. As shown in FIG. 3, the frame 12 may be formed of 16 gauge steel or some other suitable material, and preferably is adapted for installation within a wall. The dimensions of the frame will vary with the wall space and the number of service outlets to be concealed and the width of the wall accessory selected to conceal the outlets.

The frame 12 preferably comprises a pair of uprights 14 and 16. As shown in FIGS. 4 and 5, the uprights 14 and 16 preferably are U-shaped channels positioned so that the spines of the channels are opposite each other and adjacent the center of the frame 12. Referring back to FIG. 3, a brace bar 17 may be positioned where needed.

The frame 12 has at least one side adapted for supporting at least one concealed service outlet, and has at least one concealed service outlet supported thereon. As FIGS. 4, 5 and 6 suggest, the module of this invention may be constructed so as to be double-sided, that is, to have service outlets supported on both sides. This embodiment will be useful where two patient care areas requiring such services share a dividing wall. A complete description of one side of the module will be provided herein. It will be understood that both sides of a double-sided unit will be constructed similarly. Particularly in the double-sided units, insulation 18 may be provided to reduce noise travel through the wall and to aid in temperature regulation.

As used herein, "service outlet" refers to an outlet for any of a variety of selected services such as electricity, vaccum, oxygen, air, light switches, special grounding receptacles, communication connections and various electrical control devices. In most instances, the module of the present invention will provide several of these services. As used herein, "concealed service outlets" refers to those outlets, usually positioned about shoulder level, which are to be concealed in the manner to be described. It will be noted that the preferred module will also have several unconcealed service outlets usually near the floor. Typically these would include night lights, electrical outlets, and communication devices.

Service outlets, including the concealed service outlets, may be mounted in any suitable way. Preferably, the outlets will be mounted so that their position may be adjusted to accommodate walls of different thicknesses. One suitable outlet mounting frame 19 is shown in FIGS. 3, 4 and 6. A pair of strips 20 and 22 are adjustably connected by screws to a pair of U-shaped inner brackets 24 and 25. A pair of vertical cross strips 26 and 27 preferably are mounted across the ends of the horizontal strips 20 and 22 for a purpose to be described below.

Referring again to FIG. 3, the concealed service outlets, only one of which is designated by the numeral 28, are mounted to the frame 12 by attachment to the strips 20 and 22 of the mounting frame 19 in any suitable arrangement. In a similar fashion, another outlet mounting frame 31 may be mounted near the base of the frame 12 for supporting unconcealed service outlets.

In many instances, it will be preferred to install conduits, such as those designated by the reference numerals 32 and 34, in the frame as part of the module. One conduit preferably extends from each outlet and is suitably adapted for connecting the outlet with the selected service source. For example, flexible corrugated metal tubing is particularly suitable for the electrical conduits. Copper tubing is preferred for gas and vacuum services. A junction box 35 may be provided at the top of frame 12 above the ceiling and beneath the next deck.

With continuing reference to FIG. 3, each side of the frame 12 adapted for supporting a concealed service outlet preferably will be provided with a wall accessory mounting frame 36, which preferably is disposed above the concealed outlet mounting frame 19, leaving a space 37 therebetween. As shown in FIGS. 5 and 6, a preferred wall accessory mounting frame 36 comprises two L-shaped side members 39 and 40 and top and bottom members 42 and 44 connected therebetween.

The side members 39 and 40 are attached to the spine of the uprights 14 and 16 by screws 46 through slots 48 in the side members. In this way, the wall accessory mounting frame 36 may be adjusted outwardly or inwardly with respect to the module frame 12. This adjustment may be necessary to accommodate different wall thicknesses or to accommodate different wall accessory assemblies, or both.

With reference to FIGS. 5 through 8, the top and bottom members 42 and 44 preferably are angled strips each having a tab 50 (FIGS. 7 and 8) at each end which can be attached by welding, screwing or the like, to a tab 52 (FIGS. 5 and 6) at each end of the side members 39 and 40. Thus, the frontal surfaces of the wall accessory mounting frame members will be smooth, and the surface of the top and bottom members 42 and 44 will be substantially flush with the surface of side members 39 and 40. An additional angled strip 53 preferably is attached immediately under the bottom member 44 for a purpose to be described later.

Figure 9:
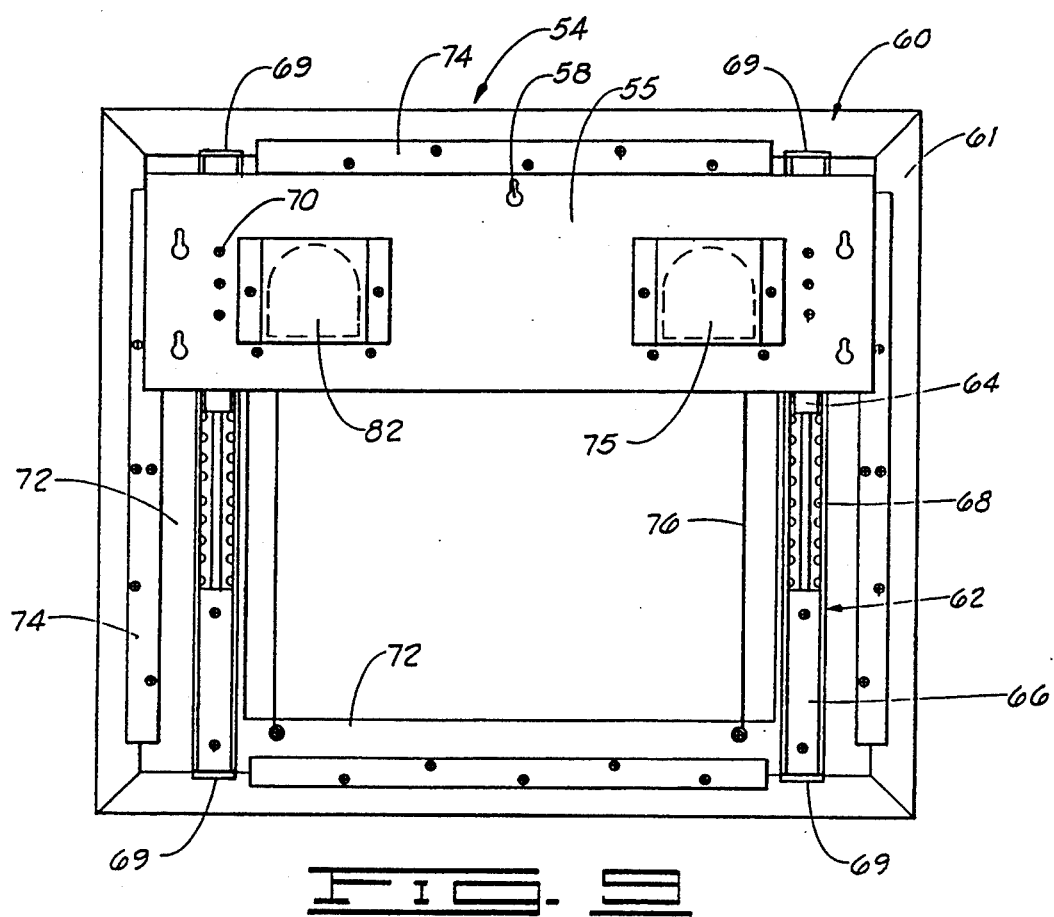
FIG. 9 shows a back elevational view of a wall accessory assembly made in accordance with the present invention. A slide assembly, a mounting assembly and retractor devices are attached. In this view, the wall accessory is in the down or closed position.
Figure 10:
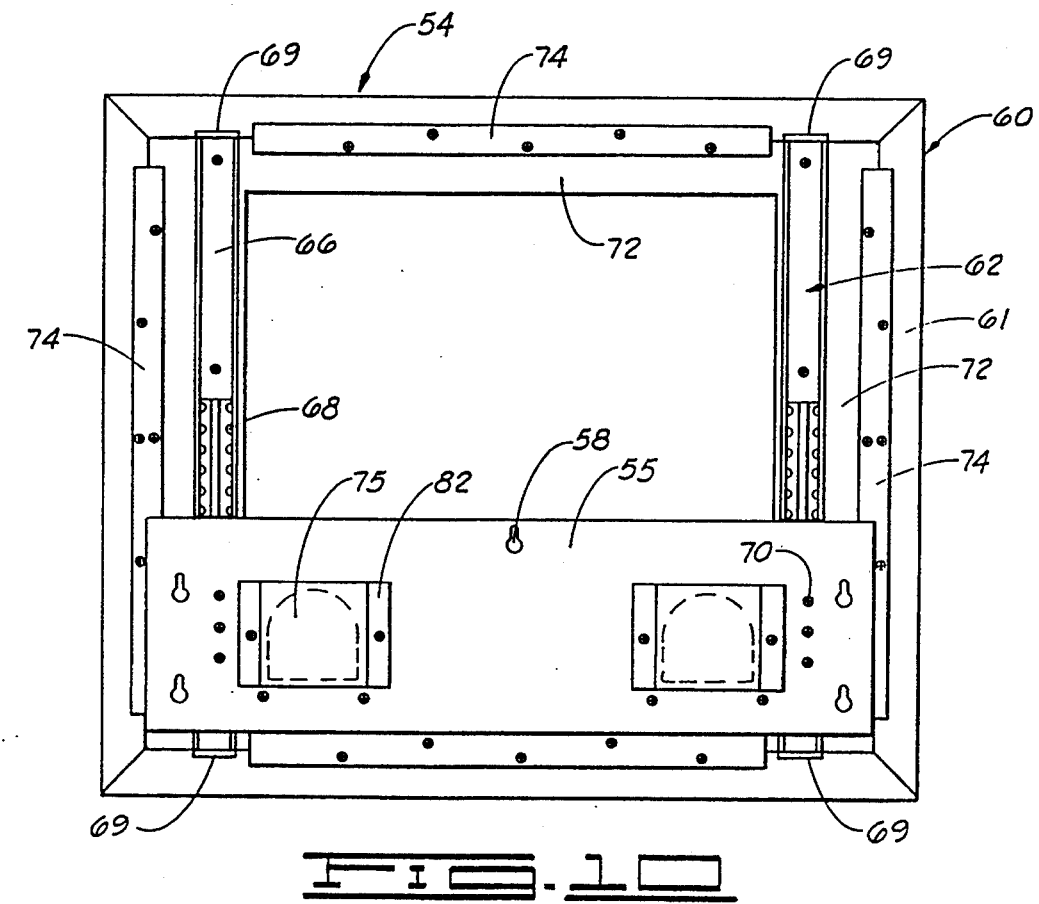
FIG. 10 shows the back of the wall accessory of FIG. 9 with the wall accessory in the up or open position.

Having constructed the frame of the module, a wall accessory assembly 54 next is constructed. Turning to FIGS. 9 and 10, a preferred wall accessory assembly 54 comprises a plate 55 on which a wall accessory may be mounted. The plate 55 preferably is removably supportable on the mounting frame 36 shown in FIGS. 7 and 8. For this purpose, a plurality of bolts 56 may be spaced about on the frame 36, and corresponding keyholes 58 may be provided in the plate 55.

Next, and referring still to FIGS. 9 and 10 and also to FIG. 1, a wall accessory 60 is selected. The wall accessory preferably will be decorative in nature, usually having a frame 61. The wall accessory 60 may be a picture or a mirror or some other object sufficient in size to conceal the outlets behind it.

Having selected a suitable wall accessory, a device such as a slide assembly is chosen for slidably mounting the wall accessory to the plate 55. The wall accessory is mounted for movement between a closed position (FIG. 1) in which the concealed service outlets are concealed, and an open position (FIG. 2) in which the concealed service outlets are accessible. The open and closed positions are in vertical alignment so that one is higher than the other.

In the preferred embodiment, the open position is above the closed position. In most applications, this arrangement will utilize the least space and will provide the least interference with other objects in the patient care area, such as other electrical outlets, furniture, and the like. However, in some instances, it may be preferred to mount the wall accessory so that it is moved down to expose the concealed service outlets.

A preferred slide assembly 62 is shown in FIGS. 9 and 10 and is available from Accuride Company of Sante Fe Springs, Calif. Typically, such an assembly will comprise telescoping inner and outer slide members 64 and 66. Preferably, the slide assembly 62 will include multiple friction bearings 68, made of steel or nylon, disposed between the contacting edges of the inner and outer members 64 and 66 of the slide assembly. A slide assembly with substantial friction is preferred as this will provide resistance to gravity and help control the descent of the wall accessory. In addition, detents 69 at ends of the outer slide member will provide a more desirable movement.

Figure 14:
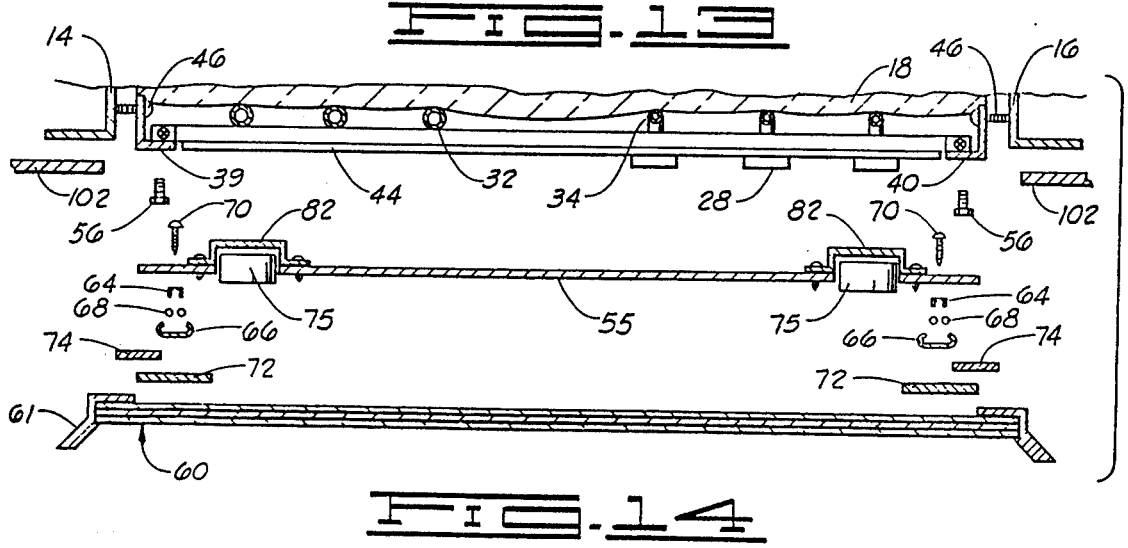
FIG. 14 is a partial horizontal cross-sectional view taken at line 14—14 in FIG. 1. Only one side of the installed module is shown.
Figure 18:
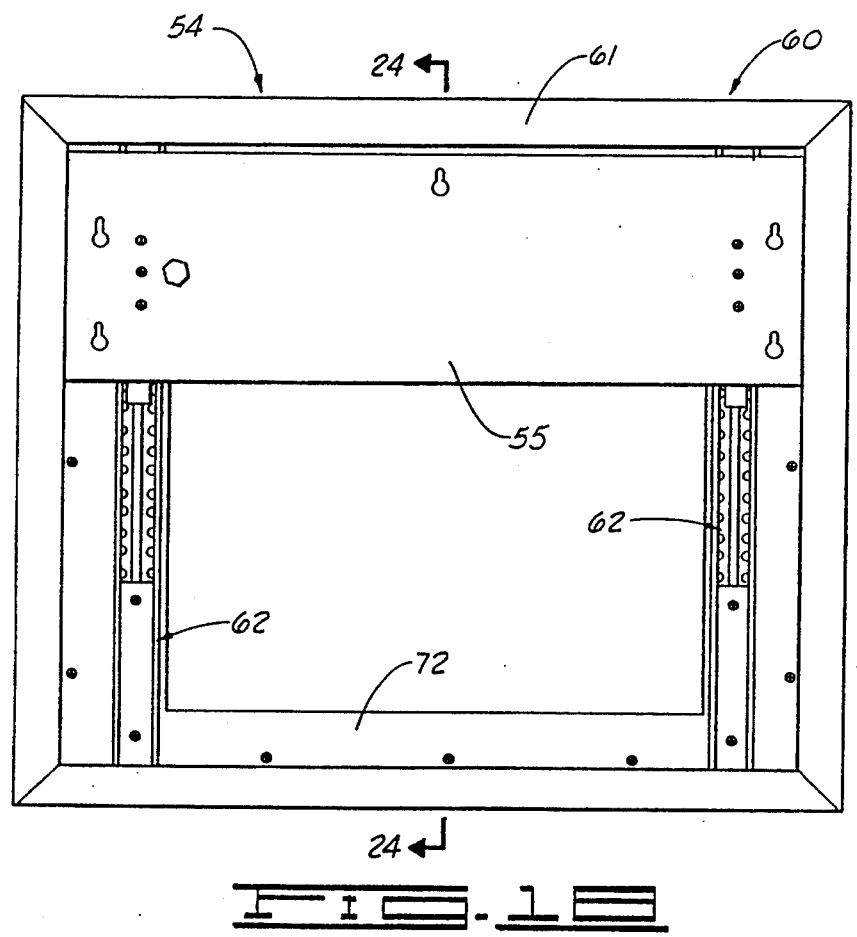
FIG. 18 is a back view of another wall accessory assembly constructed in accordance with the present invention. In this view, the wall accessory is in the closed or down position.
Figure 19:
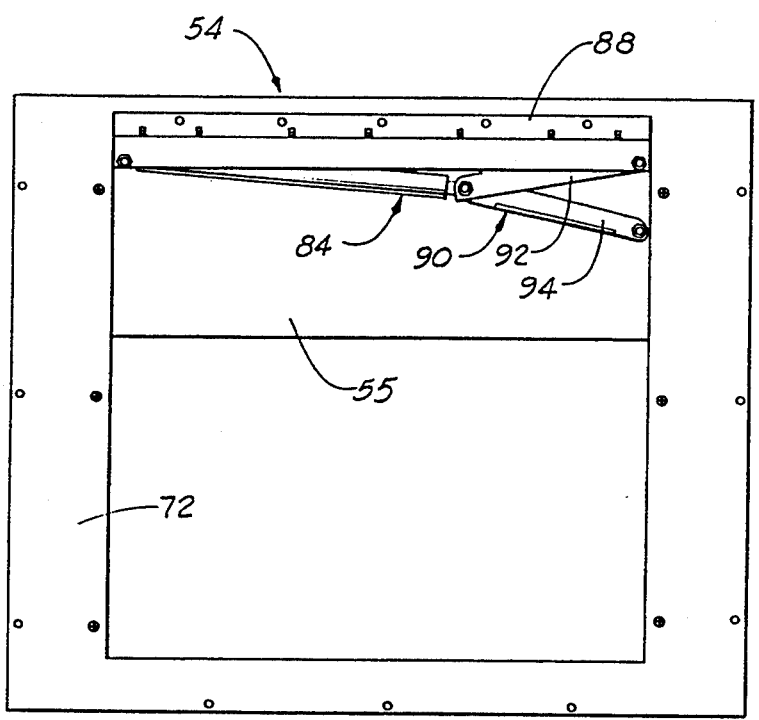
FIG. 19 is a front view of the assembly shown in FIG. 18 with the wall accessory removed. The assembly is in the closed or down position.

As best shown in FIG. 14, the inner slide member 64 is attached by screws 70 or the like to the side of the mounting plate 55 opposite the side adjacent the wall accessory mounting frame 36. The longer outer slide member 66 then preferably is mounted directly or indirectly to the back of the wall accessory 60.

Referring again to FIGS. 9 and 10, it may be possible to mount the outer slide member to the frame 61 of the wall accessory 60 if the frame is wide enough and thick enough. Alternately, as shown in FIGS. 9 and 10, a slide mounting plate 72 may be provided. The slide mounting plate 72 may be attached on or inside the back of the wall accessory frame 61. Brackets 74 may be used to attach the slide mounting plate 72 to the back of the wall accessory frame 61.

As described previously, the wall accessory is slidably mounted for up and down movement between closed and open positions. The wall accessory will be maintained in the lower position by gravity and friction in the slide assembly. The present invention also includes a device for retaining the wall accessory in the higher position. This device preferably will be characterized at least in part by providing resistance to the gravitational pull or force on the wall accessory. This resistance preferably will be in the nature of a counterbalancing mechanism such as those described below. Friction or braking devices also may be utilized. In some instances, a latch or lock of some sort will be combined with resistance type mechanisms.

One such device is a spring-wound cable retractor mechanism, such as that sold under the brand name Power-Pak marketed by Caldwell Manufacturing Co. of Rochester, N.Y. This mechanism comprises a cable wound on a spindle wherein travel tension is generated by a clock spring mechanism. Various travel lengths and tensions are available.

Figures 11, 12:
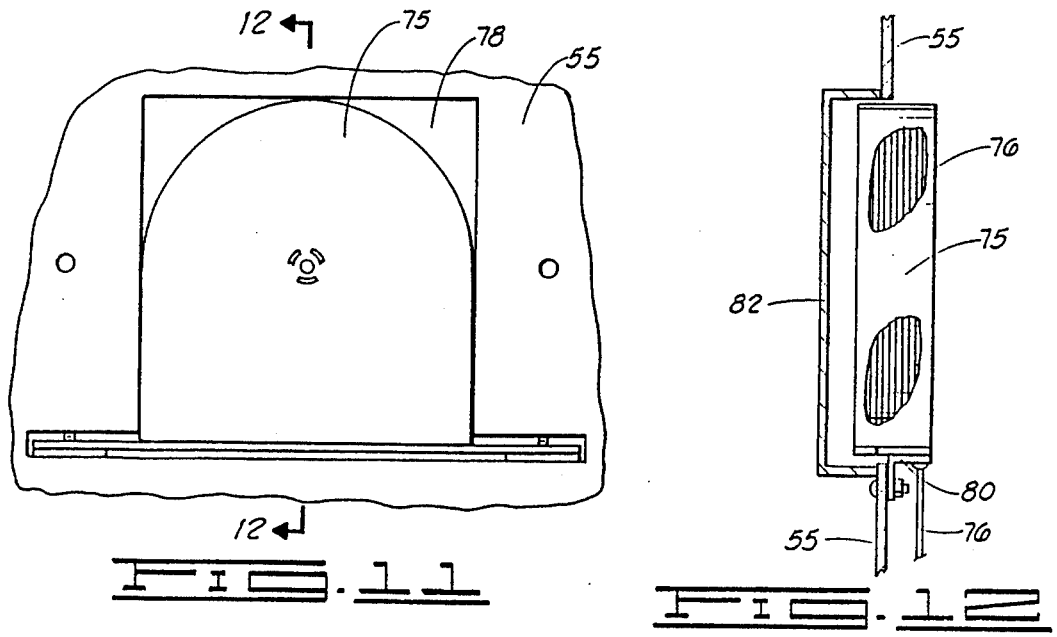
FIG. 11 is an enlarged view of one of the retractor devices indicated by dotted lines in FIGS. 9 and 10. The cover plate is removed.
FIG. 12 is a vertical cross-sectional view taken at line 12—12 in FIG. 9.
Figure 13:
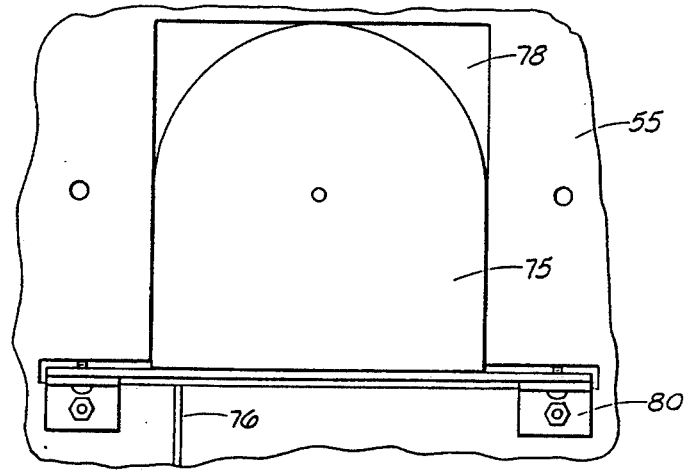
FIG. 13 is a back view of the mounted retractor device shown in FIG. 9.

Thus, as shown in FIGS. 9-17 with special reference to FIGS. 11-13, one and preferably a pair of spring-wound cable retractor mechanisms 75 are mounted to the mounting plate 55. The ends of the cables 76 then may be attached to the lower aspect of the wall accessory frame 61, or more particularly to the lower aspect of the slide mounting plate 72, best shown in FIGS. 9 and 10.

The retractor mechanisms 75 preferably are mounted on the mounting plate 55. To accommodate the thickness of the mechanisms, openings 78 are cut in the mounting plate 55 for receiving the mechanisms 75, as shown in FIGS. 11 and 12. The bases of the mechanisms 75 may be attached to the wall accessory side of the plate 55 by brackets 80. Then, as shown in FIGS. 9 and 10, pocket-like covers 82 may be affixed to the opposite side of the mounting plate 55 to support the retractor mechanisms 75 which are indicated by the dotted lines. Alternately, the plate 55 may be formed with recessed therein for receiving and supporting the retraction mechanisms 75.

In the preferred arrangement, the wall accessory 60 will be lower in the closed position (FIGS. 1, 9 and 16) than in the open position (FIGS. 2, 10 and 17). The wall accessory 60 will be moving up and down while the mounting plate 55 remains stationary. As shown in FIGS. 9 and 10, in this preferred arrangement the cables 76 will be extended in the down (closed) position and the retractors 75 will be exerting a continuous upward pull. As shown in FIG. 10, when the wall accessory is moved to the up (open) position, the cables 76 will be retracted. Thus, the tension created by the retractor mechanisms counterbalances the gravitational pull on the wall accessory. The most desirable movement characteristics will be produced when the combined tension of the retractors only slightly exceeds the resistance of the weight of the wall accessory combined with the friction factor in the selected slide assembly.

Alternately, the module may be constructed so that the wall accessory is moved down to expose the concealed services outlets. For this embodiment, the wall accessory is constructed similarly. However, in the closed position, the mounting plate is adjacent the bottom portion of the wall accessory and the cables are retracted. The cables are extended when the wall accessory is pushed down. Accordingly, the weight and friction of the wall accessory assembly in this arrangement preferably is slightly greater than the tension produced by the retractors.

An alternate apparatus for providing a counterbalance for retaining the wall accessory in the up or open position is depicted in FIGS. 18-24. In this embodiment, at least one gas cylinder 84 is used in lieu of a cable retractor mechanism. Suitable gas cylinders are sold under the brand name Suspa marketed by Suspa, Inc. of Grand Rapids, Mich. As indicated previously, the cylinder mechanism may be combined with a braking device or a latch or both.

As best shown in FIG. 20, the end of the piston 86 of the cylinder 84 preferably is connected to an upper corner of the slide mounting plate 72, and more specifically to a shelf 88 attached across the top of the wall accessory side of the slide mounting plate 72. In this way, additional operating space is provided for the cylinder 84. Where the shelf 88 is used, a spacer frame 89 may be desirable for attaching the slide mounting frame 72 to the back of the wall accessory frame 61, as best shown in FIG. 24. In some wall accessories, the shelf 88 may simply be fitted inside the back of the frame 61.

If the travel characteristics of the cylinder and the dimensions of the wall accessory permit, the other end of the cylinder is attached to the mounting plate. However, in many instances, this will not be possible as in the embodiment shown in FIGS. 18–21. In these instances, an adapter preferably will be employed.

Referring to FIG. 20, the preferred adapter 90 is scissor-like, having two arms 92 and 94. The jointed ends of the arms 92 and 94 are attached to the closed end of the cylinder 84. The free end of one arm 92 is attached to the upper corner of the wall accessory 60 and more specifically to the end of the shelf 88 opposite the end to which the piston 86 is attached. The free end of the other arm 94 is attached to the mounting frame 55 immediately beneath the arm 92.

Now it will be understood that in the preferred embodiment where the open position is higher than the closed position, the piston 86 of the cylinder 84 is retracted when the wall accessory 60 is in the closed position (FIGS. 18, 19 and 22) and in the extended position when the wall accessory is in the open or up position (FIGS. 20, 21 and 23). Accordingly, when the wall accessory 60 is pushed up, the pneumatic pressure created in the cylinder counterbalances the gravitational pull on the wall accessory. There is no significant tension exerted by the cylinder mechanism while the wall accessory is in the closed or down position. On the other hand, if the wall accessory assembly arrangement is reversed (so that it slides downward to open), the piston would remain extended while the wall accessory is in the closed or up position. Because of the long closed periods during which there is tension in the cylinder, a safety lock may be used to prevent dropping of the wall accessory in the event of cylinder failure.

As previously stated, the preferred embodiment of this module is directed to a module which can be totally concealed within the wall space behind the wall covering and the wall accessory. However, in some instances, it may be desired to cover or panel the sides of the frame so that the module may be used freestanding or adjacent a wall. Even in this embodiment, the module is well disguised.

Turning now to the procedure for in-wall installation of the module, the frame 12 is first positioned in the wall space, as shown in FIG. 3. The uprights 14 and 16 may be reinforced as needed with metal studs running from the floor to the deck above. The gas and vacuum lines and electrical wiring are connected to the appropriate sources in the usual manner.

Having positioned the frame 12 in the wall space, Sheetrock TM, drywall or other wall covering 102 is applied in the ordinary manner. As best shown in FIG. 7, the wall covering is trimmed to expose the area of the wall accessory mounting frame 36, the concealed outlet mounting frame 19 and the space 37 therebetween. Of course, any lower outlets should be left exposed as well.

Having applied the wall covering, trim panels next preferably are attached. As shown in FIGS. 1 and 2, a lower trim panel 104 may be attached over the lower unconcealed outlets 30. As indicated previously, this panel may include other features such as the night light 106.

Now referring to FIGS. 7 and 8, a trim panel 108 also is attached over the concealed service outlet mounting frame 19 and the space 37. The upper edge of the trim panel 108 will preferably overlay the strip 53. The trim panel may be conveniently secured in place by bolting the panel to the center of the vertical cross strips 26 and 27 in the concealed services outlet assembly 19. The strips 26 and 27 may need adjustment to assure proper fit of the panel 108 over the wall covering 102. If desired, a slide plate 110 may be attached to the trim plate 108 for supporting the vacuum collection bottles or other containers.

The wall accessory assembly 54 then may be mounted on the wall accessory mounting frame 36 as shown in FIGS. 14 and 17. The keyholes 58 in the mounting plate 55 are aligned with the bolts 56 on the mounting frame 36. The plate 55 and the frame 36 then are pressed together and the bolts tightened.

It will be understood now that the wall accessory assembly of this invention may be adapted for use independent of the frame to conceal previously installed service outlets. The wall accessory assembly may be mounted directly to the wall over preexisting service outlets. Alternately, a mounting frame for supporting the wall accessory assembly may be affixed to the wall around the service outlets in a manner similar to the outlet mounting frames 19 and 31 of the frame 12 previously described.

In use, when the concealed services are required, the wall accessory is pushed up or to the open position. When the services are no longer needed, the wall accessory is pushed down or to the closed position.

For other applications, the present invention provides an apparatus for mounting an object adjacent a vertical surface. The apparatus comprises a device such as the above described slide assembly for slidably mounting the object for movement between a higher and a lower position. The apparatus also comprises a device such as the above described gas cylinder or retractor mechanism, for retaining the object in the higher position. The selected device preferably is characterized by counterbalancing the gravitational force, or pull, on the object toward the lower position.

It now will be appreciated that the concealed services module of the present invention provides a pre-assembled unit for on-site delivery and rapid in-wall installation. Once installed, neither the module nor its concealed service outlets are visible when the wall accessory is in the closed position. Using this module, a patient care room can be designed which is attractive and home-like, providing a comforting and familiar environment more conducive to rest and recovery. Yet, when the concealed services are required, they are made accessible by a single, easy movement of the hand.

Changes may be made in the nature, composition, operation and arrangement of the various elements, steps and procedures described herein without departing from the spirit and scope of the invention as defined in the following claims.

What is claimed is:

1. A services module comprising:
   a frame having at least one side adapted for supporting at least one service outlet;
   at least one service outlet supported on the at least one side of the frame adapted therefor; and a picture assembly for the at least one side of the frame supporting the at least one service outlet, the picture assembly comprising:

a picture;

means for slidably mounting the picture for movement between a closed position in which the service outlet is concealed and an open position in which the service outlet is accessible, the open and closed positions being in vertical alignment so that one is higher than the other; and at least one spring-wound cable retractor device for retaining the picture in the higher position and for counterbalancing the pull of gravity on the picture.

2. The module of claim 1 in which the frame is adapted for installation within a wall so that the module is concealed when the picture is in the closed position.

3. The module of claim 1 wherein the frame is disposed in a wall and wherein the frame has two sides and each side is adapted for supporting at least one service outlet, and in which at least one service outlet is supported on each side of the frame so that selected services are accessible from both sides of the wall.

4. A services module comprising:

a frame having at least one side adapted for supporting at least one service outlet;

at least one service outlet supported on the at least one side of the frame adapted therefor; and a picture assembly for the at least one side of the frame supporting the at least one service outlet, the picture assembly comprising:

a picture;

means for slidably mounting the picture for movement between a closed position in which the service outlet is concealed and an open position in which the service outlet is accessible, the open and closed positions being in vertical alignment so that one is higher than the other; and at least one gas cylinder for retaining the picture in the higher position and for counterbalancing the pull of gravity on the picture.

5. The module of claim 4 in which the frame is adapted for installation within a wall so that the module is concealed when the picture is in the closed position.

6. The module of claim 4 wherein the frame is disposed in a wall and wherein the frame has two sides and each side is adapted for supporting at least one service outlet and at least one picture assembly, and in which at least one service outlet is supported on each side of the frame so that selected services are accessible from both sides of the wall.

7. A concealed services module comprising:

a frame having at least one side adapted for supporting at least one service outlet;

at least one service outlet supported on the at least one side of the frame adapted therefor;

a picture assembly for the at least one side of the frame on which the at least one service outlet is supported, the assembly comprising:

a picture;

means for slidably mounting the picture for movement between a closed position in which the picture conceals the outlet and an open position in which the outlet is accessible, the open and closed positions being in vertical alignment so that one is higher than the other; and at least one spring-wound cable retractor device for retaining the picture in the higher position and for counter balancing the pull of gravity on the picture; and wherein the frame is adapted for installation within a wall so that when the picture is in the closed position, the entire module is concealed.

8. The module of claim 7 in which the frame has two sides, each of which is adapted for supporting at least one service outlet and at least one picture assembly and wherein at least one service outlet and at least one picture assembly is supported on each of the two sides of the frame.

9. A concealed services module comprising:

a frame having at least one side adapted for supporting at least one service outlet;

at least one service outlet supported on the at least one side of the frame adapted therefor;

a picture assembly for the at least one side of the frame on which the at least one service outlet is supported, the picture assembly comprising:

a picture;

means for slidably mounting the picture for movement between a closed position in which the picture conceals the service outlet and an open position in which the service outlet is accessible, the open and closed positions being in vertical alignment so that one is higher than the other; and at least one gas cylinder for retaining the picture in the higher position and for counter balancing the pull of gravity on the picture; and wherein the frame is adapted for installation within a wall so that when the picture is in the closed position, the entire module is concealed.

10. The concealed services module of claim 9 in which the frame has two sides, each of which is adapted for supporting at least one service outlet and at least one picture assembly and wherein at least one concealed service outlet and at least one picture assembly is supported on each of the two sides of the frame.

11. A services module comprising:

a frame having at least one side adapted for supporting at least one service outlet;

at least one service outlet supported on the at least one side of the frame adapted therefor;

a picture on the at least one side of the frame supporting the at least one service outlet, wherein the picture is slidably mounted for movement between a closed position in which the at least one service outlet is concealed and an open position in which the at least one service outlet is accessible, the open and closed positions of the pictures being in vertical alignment so that one is higher than the other; and a retaining assembly which when activated retains the picture in the higher position by counterbalancing the pull of gravity on the picture, the retaining assembly comprising at least one spring-wound cable retractor device.

12. A services module comprising:

a frame having at least one side adapted for supporting at least one service outlet;

at least one service outlet supported on the at least one side of the frame adapted therefor;

a picture on the at least one side of the frame supporting the at least one service outlet, wherein the picture is slidably mounted for movement between a closed position in which the at least one service outlet is concealed and an open position in which the at least one service outlet is accessible, the open and closed positions of the picture being in vertical alignment so that one is higher than the other;

a retaining assembly which when activated retains the picture in the higher position by counterbalancing the pull of gravity on the picture, the retaining assembly comprising at least one gas cylinder; and wherein the frame is adapted for installation within a wall so that the entire module is concealed when the picture is in the closed position.

13. A services module comprising:

a frame having at least one side adapted for supporting at least one service outlet;

at least one service outlet supported on the at least one side of the frame adapted therefor;

a picture on the at least one side of the frame supporting the at least one service outlet, wherein the picture is slidably mounted for movement between a closed position in which the at least one service outlet is concealed and an open position in which the at least one service outlet is accessible, the open and closed positions being in vertical alignment so that one is higher than the other;

a retaining assembly which when activated retains the picture in the higher position, the retaining assembly comprising at least one spring-wound cable retractor device; and wherein the frame is adapted for installation within a wall so that the entire services module is concealed when the picture is in the closed position.

14. A services module comprising:

a frame having at least one side adapted for supporting at least one service outlet;

at least one service outlet supported on the at least one side of the frame adapted therefor;

a picture on the at least one side of the frame supporting the at least one service outlet, wherein the picture is slidably mounted for movement between a closed position in which the at least one service outlet is concealed and an open position in which the at least one service outlet is accessible, the open and closed positions of the picture being in vertical alignment so that one is higher than the other;

a retaining assembly which when activated retains the picture in the higher position, the retaining assembly comprising at least one gas cylinder; and wherein the frame is adapted for installation within a wall so that the entire module is concealed when the picture is in the closed position.

15. A services module comprising:

a frame having at least one side adapted for supporting at least one service outlet;

at least one service outlet supported on the at least one side of the frame adapted therefor;

a picture on the at least one side of the frame supporting the at least one service outlet, wherein the picture is slidably mounted for movement between a closed position in which the at least one service outlet is concealed and an open position in which the at least one service outlet is accessible, the open and closed positions of the picture being in vertical alignment so that one is higher than the other;

a retaining assembly which when activated counterbalances the pull of gravity on the picture and retains the picture in the higher position, the retaining assembly comprising at least one spring-wound cable retractor device; and wherein the frame is adapted for installation within a wall so that the entire module is concealed when the picture is in the closed position.

16. A services module comprising:

a frame having at least one side adapted for supporting at least one service outlet;

at least one service outlet supported on the at least one side of the frame adapted therefor;

a picture on the at least one side of the frame supporting the at least one service outlet, wherein the picture is slidably mounted for movement between a closed position in which the at least one service outlet is concealed and an open position in which the at least one service outlet is accessible, the open and closed positions of the picture being in vertical alignment so that one is higher than the other;

a retaining assembly which when activated counterbalances the pull of gravity on the picture and retains the picture in the higher position, the retaining assembly comprising at least one gas cylinder; and wherein the frame is adapted for installation within a wall so that the entire module is concealed when the picture is in the closed position.

17. A services module comprising:

a frame having two sides, each side of the frame adapted for supporting at least one service outlet;

at least one service outlet supported on each side of the frame adapted therefor so that selected services are accessible from both sides of a wall;

a picture on each side of the frame supporting the at least one service outlet, wherein each of the pictures are slidably mounted for movement between a closed position in which the at least one service outlet is concealed and an open position in which the at least one service outlet is accessible, the open and closed positions being in vertical alignment so that one is higher than the other;

a retaining assembly which when activated counterbalances the pull of gravity on the pictures and retains the pictures in the higher position, the retaining assembly comprising at least one spring-wound cable retractor device; and wherein the frame is adapted for installation within the wall so that the entire module is concealed when the pictures are in the closed position.

18. A services module comprising:

a frame having two sides, each side of the frame adapted for supporting at least one service outlet;

at least one service outlet supported on each side of the frame adapted therefor so that selected services are accessible from both sides of a wall;

a picture on each side of the frame supporting the at least one service outlet, wherein each of the pictures are slidably mounted for movement between a closed position in which the at least one service outlet is concealed and an open position in which the at least one service outlet is accessible, the open and closed positions of the picture on each side of the frame being in vertical alignment so that one is higher than the other;

a retaining assembly which when activated counterbalances the pull of gravity on the pictures and retains the pictures in the higher position, the retaining assembly comprising at least one gas cylinder; and wherein the frame is adapted for installation within the wall so that the entire module is concealed when the pictures are in the closed position.

19. A concealed services module comprising:
a frame having at least one side adapted for supporting at least one service outlet;
at least one service outlet supported on the at least one side of the frame adapted therefor;
a picture on the at least one side of the frame supporting the at least one service outlet, wherein the picture is slidably mounted for movement between a closed position in which the at least one service outlet is concealed and an open position in which the at least one service outlet is accessible, the open and closed positions of the picture being in vertical alignment so that one is higher than the other;
at least one spring-wound cable retractor device which when activated counterbalances the pull of gravity on the picture and retains the picture in the higher position; and
wherein the frame is adapted for installation within a wall so that when the picture is in the closed position, the entire module is concealed.

20. A concealed services module comprising:
a frame having at least one side adapted for supporting at least one service outlet;
at least one service outlet supported on the at least one side of the frame adapted therefor;
a picture on the at least one side of the frame supporting the at least one service outlet, wherein the picture is slidably mounted for movement between a closed position in which the at least one service outlet is concealed and an open position in which the at least one service outlet is accessible, the open and closed positions being in vertical alignment so that one is higher than the other;
at least one gas cylinder which when activated counterbalances the pull of gravity on the picture and retains the picture in the higher position; and wherein the frame is adapted for installation within a wall so that when the picture is in the closed position, the entire module is concealed.

21. A concealed services module comprising:
a frame having two sides, each side adapted for supporting at least one service outlet;
at least one service outlet supported on each side of the frame adapted therefor;
a picture on each side of the frame supporting the at least one service outlet, wherein each of the pictures is slidably mounted for movement between a closed position in which the at least one service outlet is concealed and an open position in which the at least one service outlet is accessible, the open and closed positions on each side of the frame being in vertical alignment so that one is higher than the other;
at least one spring-wound cable retractor device which when activated retains the pictures in the higher position; and
wherein the frame is adapted for installation within a wall so that when the pictures are in the closed position, the entire module is concealed.

22. A concealed services module comprising:
a frame having two sides, each of the sides adapted for supporting at least one service outlet;
at least one service outlet supported on each side of the frame adapted therefor;
a picture on each side of the frame supporting the at least one service outlet, wherein each of the pictures is slidably mounted for movement between a closed position in which the at least one service outlet is concealed and an open position in which the at least one service outlet is accessible, the open and closed positions on each side of the frame being in vertical alignment so that one is higher than the other;
at least one gas cylinder which when activated retains the pictures in the higher position; and
wherein the frame is adapted for installation within a wall so that when the pictures are in the closed position, the entire module is concealed.

* * * * *